(12) United States Patent
Wolf et al.

(10) Patent No.: US 12,178,153 B2
(45) Date of Patent: Dec. 31, 2024

(54) OUTDOOR TREATMENT SYSTEM WITH ROBOT CONTACT ELEMENT FOR AVOIDANCE MOVEMENT

(71) Applicant: Andreas Stihl AG & Co. KG, Waiblingen (DE)

(72) Inventors: Philip Wolf, Ebbs (AT); Georg Duregger, Niederndorf (AT)

(73) Assignee: Andreas Stihl AG & Co. KG, Waiblingen (DE)

( * ) Notice: Subject to any disclaimer, the term of this patent is extended or adjusted under 35 U.S.C. 154(b) by 323 days.

(21) Appl. No.: 17/731,848

(22) Filed: Apr. 28, 2022

(65) Prior Publication Data
US 2022/0346309 A1  Nov. 3, 2022

(30) Foreign Application Priority Data
Apr. 29, 2021  (EP) .................................... 21171257

(51) Int. Cl.
*G05D 1/00* (2024.01)
*A01D 34/00* (2006.01)
*A01D 101/00* (2006.01)

(52) U.S. Cl.
CPC ......... *A01D 34/008* (2013.01); *G05D 1/0238* (2013.01); *A01D 2101/00* (2013.01)

(58) Field of Classification Search
CPC .................................................. G05D 1/0238
See application file for complete search history.

(56) References Cited

U.S. PATENT DOCUMENTS

| 9,807,930 | B1 | 11/2017 | Lydon et al. |
| 11,934,196 | B1* | 3/2024 | Hoyda ................... G05D 1/644 |
| 2016/0058261 | A1* | 3/2016 | Dyson ...................... A47L 7/00 |
| | | | 96/423 |

(Continued)

FOREIGN PATENT DOCUMENTS

| CN | 112586194 A | 4/2021 |
| DE | 2 210 781 A | 9/1973 |

(Continued)

OTHER PUBLICATIONS

German-language European Search Report issued in European Application No. 21171257.5 dated Oct. 29, 2021 with partial English translation (11 pages).

*Primary Examiner* — Nathan L Laughlin
(74) *Attorney, Agent, or Firm* — Crowell & Moring LLP

(57) ABSTRACT

An outdoor treatment system has an autonomous mobile outdoor treatment robot and a sensor and control device. The robot has a chassis and a contact element. The chassis executes a travelling movement in a direction of travel. The contact element executes an avoiding movement in an avoiding direction as a result of the travelling movement and contact between an obstacle and a lower contact point below a height limit, and executes a detection movement in a detection direction as a result of the travelling movement and contact between an obstacle and an upper contact point at or above the height limit. The contact element is mounted to move with respect to the chassis. The avoiding direction and the detection direction are different. The sensor and control device detects the detection movement and controls a robot protective function, and does not detect or evaluate the avoiding movement.

13 Claims, 3 Drawing Sheets

(56) References Cited

U.S. PATENT DOCUMENTS

| | | | |
|---|---|---|---|
| 2019/0265724 A1* | 8/2019 | Sheng .................. | G05D 1/0088 |
| 2020/0089249 A1* | 3/2020 | Furuta .................. | A47L 9/2852 |
| 2020/0272165 A1 | 8/2020 | Ran et al. | |
| 2021/0176915 A1* | 6/2021 | Vines .................. | G05D 1/0265 |
| 2021/0185906 A1* | 6/2021 | Tsuruda ............... | G05D 1/0238 |

FOREIGN PATENT DOCUMENTS

| | | |
|---|---|---|
| DE | 10 2006 038 553 A1 | 2/2008 |
| DE | 20 2012 102 637 U1 | 12/2013 |
| DE | 20 2018 006 349 U1 | 4/2020 |
| EP | 0 628 239 B1 | 12/1998 |
| EP | 2 803 255 B1 | 7/2017 |

\* cited by examiner

OUTDOOR TREATMENT SYSTEM WITH ROBOT CONTACT ELEMENT FOR AVOIDANCE MOVEMENT

CROSS REFERENCE TO RELATED APPLICATION

This application claims priority under 35 U.S.C. § 119 from European Patent Application No. 21171257.5, filed Apr. 29, 2021, the entire disclosure of which is herein expressly incorporated by reference.

BACKGROUND AND SUMMARY

The invention relates to an outdoor treatment system.

The object of the invention is to provide an outdoor treatment system which has improved properties and enables in particular improved operation of an outdoor treatment robot.

This object is achieved by the invention by the provision of an outdoor treatment system according to the independent claims. Advantageous developments and/or embodiments of the invention are described in the dependent claims.

The outdoor treatment system according to the invention comprises an autonomous mobile outdoor treatment robot and a sensor and control device. The outdoor treatment robot comprises a chassis and a contact element. The chassis is designed to execute a travelling movement of the outdoor treatment robot in a direction of travel. The contact element is in particular formed, designed and mounted so that it can move relative to the chassis, to execute an avoiding movement in an avoiding direction as a result of the travelling movement in the direction of travel and in particular direct contact between an obstacle and a lower contact point below a height limit. The contact element is furthermore in particular formed, designed and mounted so that it can move relative to the chassis, to execute a detection movement in a detection direction as a result of the travelling movement in the direction of travel and in particular direct contact between an obstacle and an upper contact point at or above the height limit. The avoiding direction and the detection direction are in particular different from each other. The sensor and control device is designed to detect, in particular automatically, in particular only, the detection movement or a movement caused by the detection movement, and to control, in particular automatically, a protective function of the outdoor treatment robot which is, in particular only and solely, triggered, in particular only, by the detected detection movement or the detected movement. Moreover, the sensor and control device does not detect or evaluate the avoiding movement or a movement caused by the avoiding movement. In other words, the sensor and control device is designed not to detect the avoiding movement or a movement caused by the avoiding movement and/or not to control the protective function triggered by the detected avoiding movement or the detected movement.

This makes it possible to control the protective function depending on the height of the obstacle. This thus enables, on the one hand, more robust operation of the outdoor treatment robot, in particular when contact is made with a high obstacle, and, on the other hand, undisturbed or uninfluenced operation of the outdoor treatment system, in particular when contact is made with a low obstacle such as, for example, an insignificantly small object, in particular by reducing the faulty triggering of the sensor and control device. This thus enables improved operation of the outdoor treatment robot.

In particular, the outdoor treatment system, the outdoor treatment robot and/or the sensor and control device are electric.

The outdoor treatment robot can comprise the sensor and control device.

An autonomous mobile outdoor treatment robot can mean that the outdoor treatment robot can be designed to move in an automatic or independent or self-controlled manner and/or independently of a user, in particular on a surface which can be predetermined and/or limited, and/or to treat the surface in an automatic or independent or self-controlled manner and/or independently of the user, in particular to start and/or finish the treatment.

The outdoor treatment system can be a system for treating open or outside surfaces or a system for treating grassy surfaces. Additionally or alternatively, the outdoor treatment robot can be a robot for treating open or outside surfaces or a robot for treating grassy surfaces. Furthermore, additionally or alternatively, the outdoor treatment robot can be an appliance for treating gardens and/or patios.

The term "undercarriage" can be used as a synonym for the term "chassis".

The chassis can comprise at least one driven wheel and at least one non-driven wheel for performing the travelling movement of the outdoor treatment robot, in particular on a surface. At least the non-driven wheel can in particular be arranged in front of at least the driven wheel in the direction of travel.

The travelling movement in the direction of travel can be a forward movement.

The term "contact part" can be used as a synonym for the term "contact element".

Contact with an obstacle can be made by a side facing in the direction of travel or forwards, or the front side, of the contact element.

No part of the outdoor treatment robot needs to or can in particular be arranged in front of the contact element, in particular in the direction of travel, in particular at the same height and/or below.

The height limit can be defined by at least one section of a shape or a contour or an outline of the contact element. Additionally or alternatively, the height limit can comprise, in particular be, a height line. Furthermore, additionally or alternatively, the height limit can be referred to as a filter limit.

The contact element can be designed to execute the avoiding movement and/or the detection movement only or solely and/or directly and/or mechanically and/or caused by the travelling movement in the direction of travel and the, in particular respective, contact with an obstacle and/or by the travelling movement in the direction of travel and the, in particular respective, contact with an obstacle simultaneously or jointly or together.

The avoiding direction and the detection direction can be opposite each other.

The sensor and control device can be designed to detect the detection movement or the movement and/or to control the protective function triggered by the detected detection movement or the detected movement in the case of a minimum movement or a minimum value. Additionally or alternatively, the sensor and control device can comprise a Hall effect sensor and/or a switch and/or a feeler, in particular for detecting the detection movement or the movement. Furthermore, additionally or alternatively, the sensor and control device can comprise a computing unit, in particular a processor, and/or a memory unit.

The term "effected" can be used as a synonym for the term "caused".

In a development of the invention, the avoiding direction is, in particular at least partially, upward. Additionally or alternatively, the detection direction is, in particular at least partially, downward. This, in particular the upward avoiding direction, makes it possible to avoid the low obstacle.

In a development of the invention, the chassis defines or comprises a plane of travel. Additionally, the lower contact point and the upper contact point are in particular arranged in a height direction which is orthogonal with respect to the plane of travel. Furthermore, additionally or alternatively, the height limit is in particular arranged, in particular in the height direction, above the plane of travel. Furthermore, additionally or alternatively, the avoiding direction is, in particular non-orthogonally, in particular parallel, with respect to the height direction, away from the plane of travel. Furthermore, additionally or alternatively, the detection direction is, in particular non-orthogonally, in particular anti-parallel, with respect to the height direction, towards the plane of travel. In particular, the chassis can comprise wheels for performing the travelling movement of the outdoor treatment robot, in particular on the surface. The wheels can define the plane of travel. Additionally or alternatively, the plane of travel can be horizontal. Furthermore, additionally or alternatively, the height direction can be vertical. Furthermore, additionally or alternatively, non-orthogonal can mean a deviation, in particular an angular deviation, of no more than 30° (degrees), in particular no more than 20°, in particular no more than 10°, and/or no less than 150°, in particular no less than 160°, in particular no less than 170°.

In a development of the invention, the outdoor treatment robot comprises at least one element swing arm. At least the element swing arm is mounted so that it can move in rotation about an axis of rotation. The axis of rotation is in particular arranged non-parallel, in particular orthogonally, with respect to the direction of travel. The contact element is connected to at least the element swing arm in such a way that the avoiding movement in the avoiding direction causes an avoiding rotational movement at least of the element swing arm about the axis of rotation in an avoiding rotational direction, in particular directly, and the detection movement in the detection direction causes a detection rotational movement at least of the element swing arm about the axis of rotation in a detection rotational direction, in particular directly. The avoiding rotational direction and the detection rotational direction are different, in particular from each other. The sensor and control device is designed to detect, in particular automatically, in particular only, the detection rotational movement or a movement caused by the detection rotational movement, and to control, in particular automatically, the protective function, in particular only or solely, triggered by, in particular only, the detected detection rotational movement or the detected movement. Furthermore, the sensor and control device does not detect or evaluate the avoiding rotational movement or a movement caused by the avoiding rotational movement. In other words, the sensor and control device is designed not to detect the avoiding rotational movement or a movement caused by the avoiding rotational movement and/or not to control the protective function triggered by the detected avoiding rotational movement or the detected movement. This enables at least a movement in at least one direction which is different from upwards and/or downwards and/or the height direction. In particular, the movement in the direction can be detected simply. In particular, the term "element carrier" or "element arm" can be used as synonyms for the term "element swing arm". Additionally or alternatively, at least the element swing arm can be mounted so that it can move in rotation with respect to the chassis. Furthermore, additionally or alternatively, non-parallel can mean a deviation, in particular an angular deviation, of no less than 60°, in particular no less than 70°, in particular no less than 80°, and/or no more than 120°, in particular no more than 110°, in particular no more than 100°. Furthermore, additionally or alternatively, the axis of rotation can in particular be arranged non-orthogonally, in particular parallel, with respect to the plane of travel. Furthermore, additionally or alternatively, the axis of rotation can be horizontal. Furthermore, additionally or alternatively, the contact element can be connected to at least one free end of at least the element swing arm. Furthermore, additionally or alternatively, the contact element can be connected mechanically and/or directly and/or rigidly or fixedly to at least the element swing arm. Furthermore, additionally or alternatively, at least the element swing arm and the contact element can in particular be designed as interconnected, integral or a single piece. Furthermore, additionally or alternatively, the avoiding rotational direction and the detection rotational direction can be opposite each other.

In an embodiment of the invention, at least the element swing arm is a pushed element swing arm. Additionally or alternatively, the axis of rotation is in particular arranged above the height limit, in particular when no contact is made with an obstacle. This, and in particular the pushed element swing arm, enables contact to be made between an obstacle and the contact element. Additionally or alternatively, this, and in particular the axis of rotation above the height limit, makes it possible for the avoiding direction and the detection direction to be different. In particular, the contact element can in particular be arranged in front of the axis of rotation, in particular in the direction of travel.

In a development of the invention, the contact element below the height limit comprises an in particular inclined course from top front to bottom rear, in particular counter to the direction of travel or is formed so that it extends from top front to bottom rear, in particular when no contact is made with an obstacle. In particular, the course has an angle relative to the direction of travel of no more than 60°, in particular no more than 45°, in particular 30°, and/or no less than 10°. Additionally or alternatively, the contact element has, at or above the height limit, a course from bottom front upwards, in particular backwards, in particular counter to the direction of travel or is formed so that it extends from bottom front upwards, in particular backwards, in particular when no contact is made with an obstacle. At least the course enables, in particular the different courses enable, the avoiding movement in the avoiding direction and/or the detection movement in the in particular different detection direction. In particular, the course can be a straight line or be convex, in particular outwardly, from top front to bottom rear.

In a development of the invention, the outdoor treatment robot comprises a cover hood. The cover hood is in particular arranged above the contact element. Furthermore, the cover hood is mounted so that it can move, in particular directly, with respect to the chassis. The contact element is mounted so that it can move with respect to the cover hood in such a way that the detection movement causes a hood movement, in particular counter to the direction of travel, of the cover hood with respect to the chassis, in particular, and the avoiding movement does not. The sensor and control device is designed to detect, in particular automatically, the hood movement or a movement caused by the hood movement and to control, in particular automatically, the protective function, in particular only or solely, triggered by the detected hood movement or the detected movement. This, and in particular the hood movement, makes it possible for the detection to be simple. Additionally or alternatively, the cover hood provides protection for the outdoor treatment robot, in particular the chassis, and/or the sensor and control device. In particular, the term "protective hood" can be used as a synonym for the term "cover hood". Additionally or alternatively, the cover hood can in particular be arranged behind the contact element, in particular counter to the direction of travel, at the same height and/or below the contact element. Furthermore, additionally or alternatively, at least the element swing arm can be mounted, in particular directly, so that it can move rotatably on the cover hood. Furthermore, additionally or alternatively, the detection rotational movement can cause the hood movement, in particular directly. Furthermore, additionally or alternatively, the avoiding rotational movement does not need to or cannot cause the hood movement. Furthermore, additionally or alternatively, the formulation "backwards" can be used as a synonym for the formulation "counter to the direction of travel".

In an embodiment of the invention, the cover hood is designed, in particular formed, to execute the hood movement as a result of the travelling movement in the direction of travel and an in particular direct contact of an obstacle with a hood point. The enables the protective function to be controlled when contact is made with a particularly high obstacle and/or, in particular by so doing, a synergistic effect. In particular, the hood point can in particular be arranged above the upper contact point. Additionally or alternatively, the cover hood can be designed to execute the hood movement only or solely and/or directly and/or mechanically and/or caused by the travelling movement in the direction of travel and the contact with an obstacle and/or by the travelling movement in the direction of travel and the contact with an obstacle simultaneously or jointly or together.

In a development, in particular an embodiment, of the invention, the contact element is suspended by means of a spring and/or on the cover hood, where present. Additionally or alternatively, the contact element is designed to in particular directly contact or to lie on an, in particular the, surface to be treated. This, and in particular the suspension, enables the avoiding movement in the avoiding direction, in particular upwards, to be facilitated. Additionally or alternatively, this, and in particular the contact with the surface, enables the height limit, in particular above the plane of travel, to be defined. In particular, the spring can be a helical and/or tension spring. Additionally or alternatively, the surface can be one to be treated by means of the outdoor treatment robot. Furthermore, additionally or alternatively, the surface can be an open surface, in particular an unsealed surface, or a green space such as a grassy area with lawns. Furthermore, additionally, the surface can be a surface with paving slabs, patio tiles and/or paving stones.

In an embodiment of the invention, the contact element is designed to slide on, in particular slide up and over, the surface, in particular as a skid. Additionally or alternatively, the contact element is designed to roll on the surface, in particular as a roller. In particular, the term "carriage" can be used as a synonym for the term "skid".

In a development of the invention, the outdoor treatment robot comprises a treatment tool. The contact element is in particular arranged in front of the treatment tool, in particular in the direction of travel. This enables, in particular in the case of the travelling movement in the direction of travel, the protective function to be controlled for more robust operation. In particular, the treatment tool can be designed to treat the surface. Additionally or alternatively, the treatment tool can comprise, in particular be, a cutting tool. Furthermore, additionally or alternatively, the treatment tool can comprise, in particular be, a cleaning tool, in particular a wire brush.

In a development of the invention, the outdoor treatment robot comprises a, in particular the, treatment tool. The treatment tool comprises a lawn mowing tool, and in particular is the lawn mowing tool. Additionally or alternatively, the outdoor treatment robot is designed as a robot lawn mower. In particular, the lawn mowing tool can be designed for mowing the surface. Additionally or alternatively, the lawn mowing tool can comprise at least one strimmer line, at least one plastic cutter, at least one metal cutter and/or a metal blade with at least one cutting edge and/or with at least one cutting tooth. Furthermore, additionally or alternatively, the robot lawn mower can be a mulching robot lawn mower.

In a development of the invention, the outdoor treatment robot comprises a tool system. The tool system comprises a, in particular the, treatment tool. The sensor and control device is designed to control, in particular automatically, in particular to deactivate the tool system as the protective function. Additionally or alternatively, the outdoor treatment robot comprises a travel system. The travel system comprises the chassis. The sensor and control device is designed to control, in particular automatically, in particular to deactivate the travel system as the protective function. This enables more robust operation. In particular, the tool system and/or the travel system can be electric and/or controllable. Additionally or alternatively, the tool system can comprise an in particular electric and/or controllable drive motor for driving and/or moving the treatment tool. Furthermore, additionally or alternatively, the treatment tool can be drivable and/or movable. Furthermore, additionally or alternatively, the treatment tool can be designed to treat the surface. Furthermore, additionally or alternatively, the treatment tool can comprise, in particular be, a cutting tool. Furthermore, additionally or alternatively, the treatment tool can comprise, in particular be, a cleaning tool, in particular a wire brush. Furthermore, additionally or alternatively, the travel system can comprise an in particular electric and/or controllable drive motor for driving and/or moving at least the driven wheel. Furthermore, additionally or alternatively, the sensor and control device can be designed to control the travel system in order to move around the in particular high obstacle and/or away from the in particular high obstacle as the protective function. Furthermore, additionally or alternatively, the term "stop" can be used as a synonym for the term "deactivate".

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
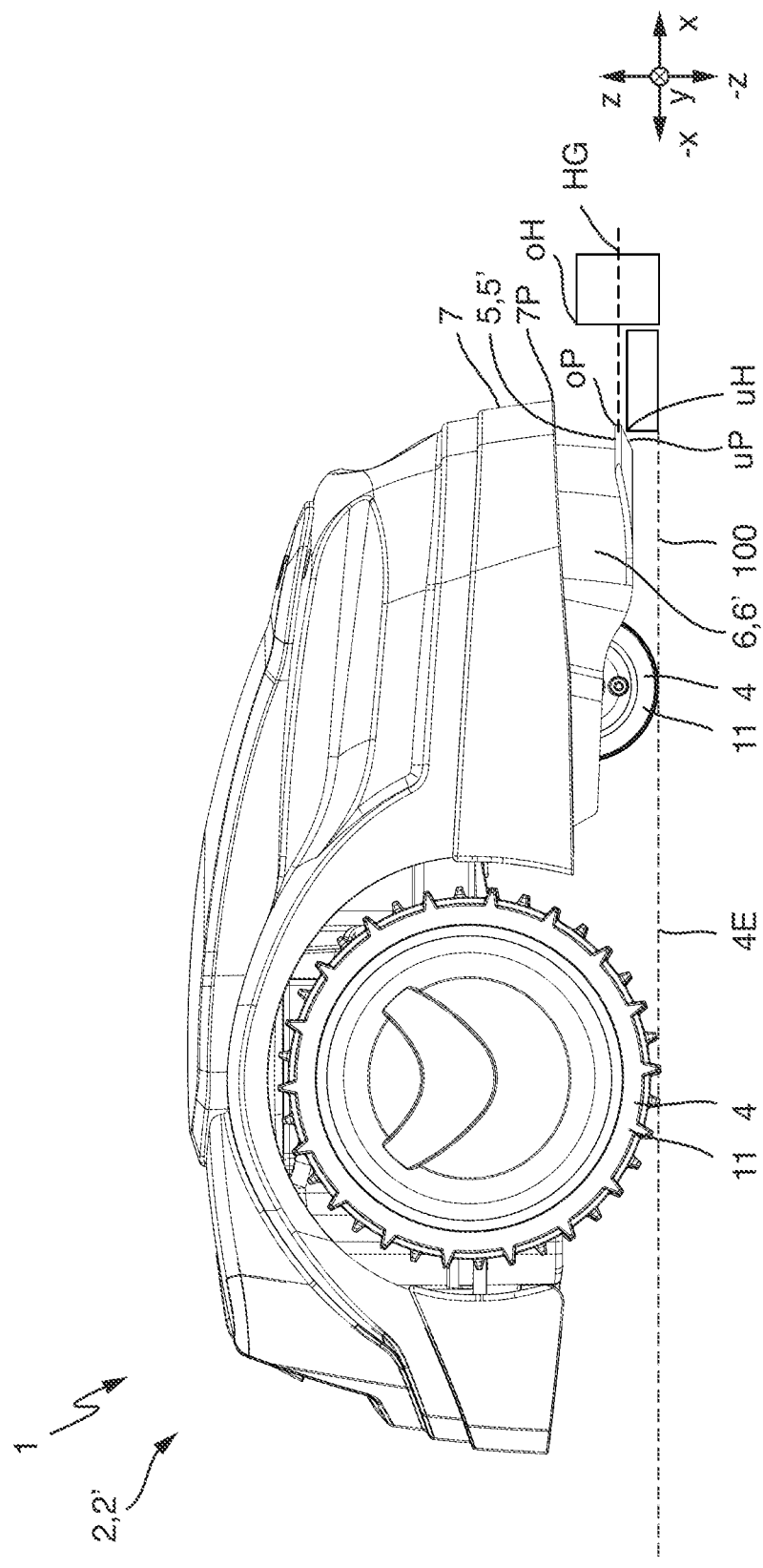
FIG. 1 is a view of a side of an outdoor treatment system according to an embodiment of the invention having an outdoor treatment robot.
Figure 2:
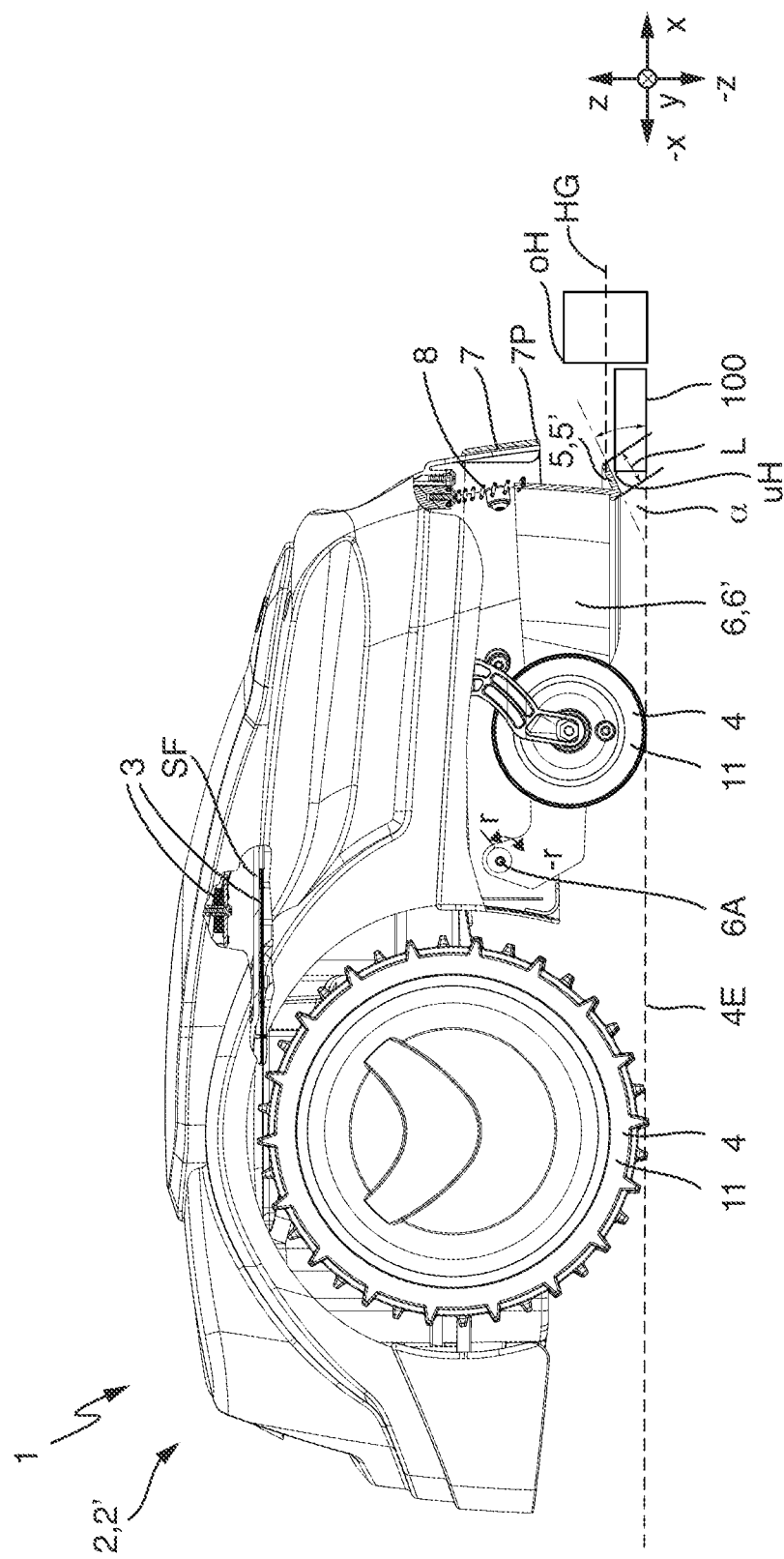
FIG. 2 is a partial view in section of a side of the outdoor treatment robot from FIG. 1.
Figure 3:
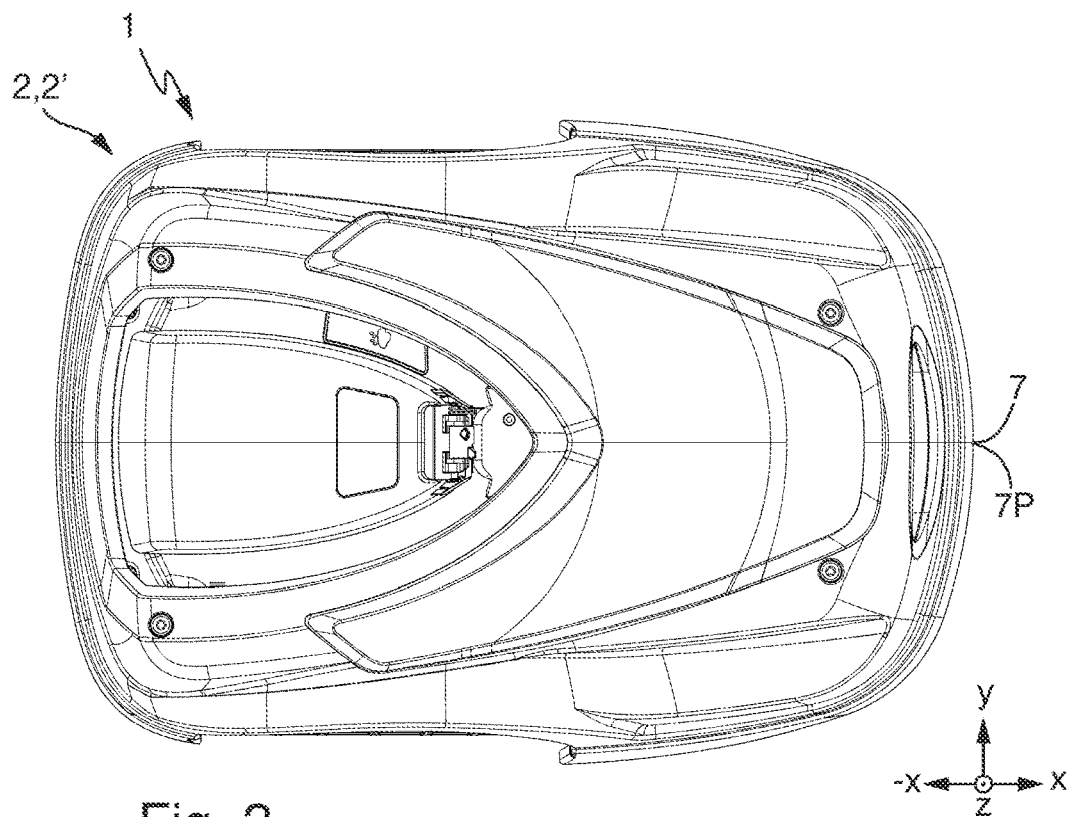
FIG. 3 is a view from above of the outdoor treatment robot from FIG. 1.
Figure 4:
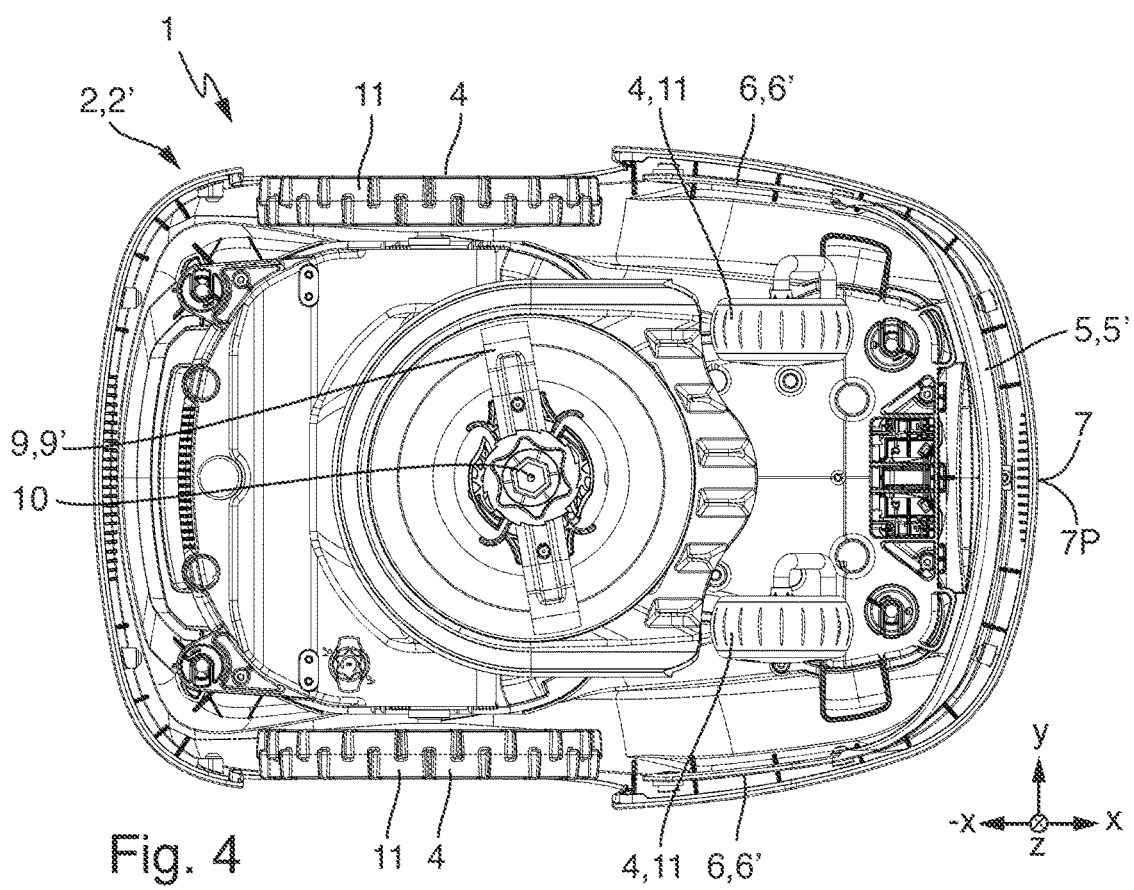
FIG. 4 is a schematic view from below of the outdoor treatment robot from FIG. 1.

FIGS. 1 to 4 show an outdoor treatment system 1. The outdoor treatment system 1 comprises an autonomous mobile outdoor treatment robot 2 and a sensor and control device 3. The outdoor treatment robot 2 comprises a chassis 4 and a contact element 5. The chassis 4 is designed to execute a travelling movement of the outdoor treatment robot 2 in an in particular horizontal direction of travel x, in particular moves and thus travels. The contact element 5 is designed to execute an avoiding movement in an avoiding direction z as a result of the travelling movement in the direction of travel x and contact with an obstacle or contact between an in particular low obstacle uH and a lower contact point uP below a height limit HG and is mounted so that it can move with respect to the chassis 4, in particular makes contact and thus moves and avoids the obstacle. Furthermore, the contact element 5 is designed to execute a detection movement in a detection direction -z as a result of the travelling movement in the direction of travel x and contact with an obstacle or contact between an in particular high obstacle oH and an upper contact point oP at or above the height limit HG and is mounted so that it can move with respect to the chassis 4, in particular makes contact and thus moves and thus performs the detection. The avoiding direction z and the detection direction -z are different. The sensor and control device 3 is designed to detect the detection movement or a movement caused by the detection movement and to control a protective function SF of the outdoor treatment robot 2 triggered by the detected detection movement or the detected movement, in particular performs the detection and thus performs the controlling. Moreover, the sensor and control device 3 does not detect or evaluate the avoiding movement or a movement caused by the avoiding movement.

In detail, the avoiding direction z is upward.

Additionally or alternatively, the detection direction -z is downward.

Furthermore, the chassis 4 comprises a plane of travel 4E.

Additionally, the lower contact point uP and the upper contact point oP are in a height direction z which is orthogonal with respect to the plane of travel 4E.

Furthermore, additionally or alternatively, the height limit HG is, in particular in the height direction z, above the plane of travel 4E.

Furthermore, additionally or alternatively, the avoiding direction z is, in particular non-orthogonally, in particular parallel, with respect to the height direction z, away from the plane of travel 4E.

Furthermore, additionally or alternatively, the detection direction -z is, in particular non-orthogonally, in particular anti-parallel, with respect to the height direction z, towards the plane of travel 4E.

In addition, the outdoor treatment robot 2 comprises at least one element swing arm 6. At least the element swing arm 6 is mounted so that it can move in rotation about an axis of rotation 6A. The axis of rotation 6A is non-parallel, in particular orthogonal, with respect to the direction of travel x. The contact element 5 is connected to at least the element swing arm 6 in such a way that the avoiding movement in the avoiding direction z causes an avoiding rotational movement at least of the element swing arm 6 about the axis of rotation 6A in an avoiding rotational direction r, and the detection movement in the detection direction -z causes a detection rotational movement at least of the element swing arm 6 about the axis of rotation 6A in a detection rotational direction -r. The avoiding rotational direction r and the detection rotational direction -r are different. The sensor and control device 3 is designed to detect the detection rotational movement or a movement caused by the detection rotational movement and to control the protective function SF triggered by the detected detection rotational movement or the detected movement, in particular performs the detection and thus performs the controlling. Furthermore, the sensor and control device 3 does not detect or evaluate the avoiding rotational movement or a movement caused by the avoiding rotational movement.

In the exemplary embodiment shown, the outdoor treatment robot 2 comprises two element swing arms 6. In alternative exemplary embodiments, the outdoor treatment robot 2 can comprise just a single element swing arm or at least three element swing arms.

In detail, at least the element swing arm 6 is a pushed element swing arm 6'.

Additionally or alternatively, the axis of rotation 6A is above the height limit HG, in particular when no contact is made with an obstacle.

Moreover, in the exemplary embodiment shown, the contact element 5 extends from the right, in particular a right-hand side, to the left, in particular to a left-hand side, of the outdoor treatment robot 2 or non-parallel, in particular orthogonally, with respect to the direction of travel x and/or non-parallel, in particular orthogonally, with respect to the height direction z and/or non-orthogonally, in particular parallel, with respect to the plane of travel 4E and/or the axis of rotation 6A.

Furthermore, the contact element comprises, below the height limit HG, a course from top front to bottom rear, in particular counter to the direction of travel -x, in particular when no contact is made with an obstacle.

In particular, the course has at least an angle a relative to the in particular horizontal direction of travel x of no less than 10° and/or no more than 60°, in particular when no contact is made with an obstacle.

Additionally or alternatively, the course has a length L of no less than 5 mm (millimeters) and/or no more than 100 mm.

Furthermore, additionally or alternatively, the contact element 5 comprises, at or above the height limit HG, a course from bottom front upwards, in particular backwards, in particular counter to the direction of travel -x, in particular when no contact is made with an obstacle.

In addition, the outdoor treatment robot 2 comprises a cover hood 7. The cover hood 7 is above the contact element 5. Furthermore, the cover hood 7 is mounted so that it can move with respect to the chassis 4. The contact element 5 is mounted so that it can move with respect to the cover hood 7 in such a way that the detection movement causes a hood movement, in particular counter to the direction of travel -x, of the cover hood 7 with respect to the chassis 4, in particular, and the avoiding movement does not. The sensor and control device 3 is designed to detect the hood movement or a movement caused by the hood movement and to control the protective function SF triggered by the detected hood movement or the detected movement, in particular performs the detection and thus performs the controlling.

In detail, the cover hood 7 is designed to execute the hood movement as a result of the travelling movement in the direction of travel x and contact between an obstacle and a hood point 7P.

In the exemplary embodiment shown, at least the element swing arm 6 is mounted so that it can move in rotation on the cover hood 7, in particular by means of at least one swivel joint.

Additionally or alternatively, the detection rotational movement causes the hood movement, in particular, and the avoiding rotational movement does not.

Moreover, the sensor and control device 3 comprises a Hall effect sensor which, in the exemplary embodiment shown, is arranged fixedly with respect to the chassis 4, in particular is fastened thereto. Furthermore, the sensor and control device 3 comprises a magnet which, in the exemplary embodiment shown, is arranged fixedly with respect to the cover hood 7, in particular is fastened thereto. The Hall effect sensor is designed to detect a relative movement of the magnet, in particular to detect the hood movement, in particular performs the detection. In alternative exemplary embodiments, the Hall effect sensor can be arranged fixedly with respect to the cover hood and the magnet can be arranged fixedly with respect to the chassis. Additionally or alternatively, in alternative exemplary embodiments, the sensor and control device can comprise a switch and/or a feeler.

Furthermore, the contact element 5 is suspended by means of a spring 8 and/or on the cover hood 7.

Additionally or alternatively, the contact element 5 is designed to make contact with a surface 100 to be treated, in particular makes contact.

In detail, the contact element 5 is designed to slide on the surface 100, in particular as a skid 5', in particular slides.

In alternative exemplary embodiments, the contact element can be designed to roll on the surface, in particular as a roller, in particular wherein the roller, by virtue of its diameter, in particular only, rolls over the low obstacle and not over the high obstacle.

In addition, the outdoor treatment robot 2 comprises a treatment tool 9.

Additionally, the contact element 5 is in front of the treatment tool 9, in particular in the direction of travel x.

Furthermore, the treatment tool 9 comprises a lawn mowing tool 9'.

Additionally or alternatively, the outdoor treatment robot 2 is designed as a robot lawn mower 2'.

Moreover, the outdoor treatment robot 2 comprises a tool system 10. The tool system 10 comprises a treatment tool 9. The sensor and control device 3 is designed to control, in particular to deactivate, the tool system 10 as the protective function SF, in particular performs the controlling, in particular performs the deactivation.

Additionally or alternatively, the outdoor treatment robot 2 comprises a travel system 11. The travel system 11 comprises the chassis 4. The sensor and control device 3 is designed to control, in particular to deactivate, the travel system 11 as the protective function SF, in particular performs the controlling, in particular performs the deactivation.

In the exemplary embodiment shown, the sensor and control device 3 is designed to control the travel system 11 in order to move around the, in particular high, obstacle oH and/or away from the, in particular high, obstacle oH as the protective function SF.

In summary and/or in other words, the contact element 5, which is mounted so that it can move in rotation or is pivotable and is designed as the skid 5', slides or lies on the surface 100.

When contact is made with the high or steep object oH, the skid 5' does not travel over it and instead is pressed downwards by it, in particular initially by the chassis 4 continuing to travel forwards, at least the element swing arm 6 is blocked, the cover hood 7 is moved or tilted or deflected, in particular backwards, and the sensor and control device 3 performs the detection and controlling or reacts. In particular, the sensor and control device 3 recognizes or detects this as a collision and changes the direction of movement of the outdoor treatment robot 2, in particular turns and moves the latter away from the high obstacle oH. The treatment tool 9 thus does not treat, in particular the lawn mowing tool 9' does not cut or mow, the high obstacle oH.

When it makes contact with a low obstacle uH, the skid 5' travels over it and is pressed upwards by it, in particular by the chassis 4 continuing to travel forwards, at least the element swing arm 6 pivots, the cover hood 7 is not moved and the sensor and control device 3 does not detect anything and/or does not control anything.

As made clear by the exemplary embodiments which are shown and are explained above, the invention provides an advantageous outdoor treatment system which has improved properties, in particular enables improved operation of an outdoor treatment robot.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An outdoor treatment system, comprising:
an autonomous mobile outdoor treatment robot,
wherein the outdoor treatment robot comprises a chassis and a contact element,
wherein the chassis is designed to execute a travelling movement of the outdoor treatment robot in a direction of travel,
wherein the contact element is designed to execute an avoiding movement in an avoiding direction as a result of the travelling movement in the direction of travel and contact between an obstacle and a lower contact point below a height limit and to execute a detection movement in a detection direction as a result of the travelling movement in the direction of travel and contact between an obstacle and an upper contact point at or above the height limit, the contact element being mounted so as to be movable with respect to the chassis,
wherein the avoiding direction and the detection direction are different,
wherein the height limit is defined by a section of a shape, contour or outline of the contact element, and,
wherein the contact element is configured to execute the avoiding movement and/or the detection movement only or solely caused by the travelling movement in the direction of travel and the simultaneous contact of the contact element with the obstacle; and
a sensor and control device,
wherein the sensor and control device is designed to detect the detection movement or a movement caused by the detection movement, and to control a protective function of the outdoor treatment robot triggered by the detected detection movement or the detected movement, and wherein the sensor and control device does not detect or evaluate the avoiding movement or a movement caused by the avoiding movement.

2. The outdoor treatment system according to claim 1, wherein the avoiding direction is upwards, and/or wherein the detection direction is downwards.

3. The outdoor treatment system according to claim 1, wherein the chassis comprises a plane of travel, and wherein the lower contact point and the upper contact point are in a height direction which is orthogonal with respect to the plane of travel, and/or wherein the height limit is above the plane of travel, and/or wherein the avoiding direction is, non-orthogonally with respect to the height direction, away from the plane of travel, and/or wherein the detection direction is, non-orthogonally with respect to the height direction, towards the plane of travel.

4. The outdoor treatment system according to claim 1, wherein the contact element below the height limit comprises a course from top front to bottom rear, counter to the direction of travel, with an angle relative to the direction of travel of no more than 60°, when no contact is being made with an obstacle, and/or wherein the contact element at or above the height limit comprises a course from bottom front upwards counter to the direction of travel, when no contact is being made with an obstacle.

5. The outdoor treatment system according to claim 1, wherein the outdoor treatment robot comprises a treatment tool, wherein the contact element is in front of the treatment tool in the direction of travel.

6. The outdoor treatment system according to claim 1, wherein the outdoor treatment robot comprises a lawn mowing tool, and/or wherein the outdoor treatment robot is a robot lawn mower.

7. The outdoor treatment system according to claim 1, wherein the outdoor treatment robot comprises a tool system, wherein the tool system comprises a treatment tool, and wherein the sensor and control device is designed to deactivate the tool system as the protective function, and/or wherein the outdoor treatment robot comprises a travel system, wherein the travel system comprises the chassis, and wherein the sensor and control device is designed to deactivate the travel system as the protective function.

8. An outdoor treatment system, comprising:
an autonomous mobile outdoor treatment robot,
wherein the outdoor treatment robot comprises a chassis and a contact element,
wherein the chassis is designed to execute a travelling movement of the outdoor treatment robot in a direction of travel,
wherein the contact element is designed to execute an avoiding movement in an avoiding direction as a result of the travelling movement in the direction of travel and contact between an obstacle and a lower contact point below a height limit and to execute a detection movement in a detection direction as a result of the travelling movement in the direction of travel and contact between an obstacle and an upper contact point at or above the height limit, the contact element being mounted so as to be movable with respect to the chassis, wherein the avoiding direction and the detection direction are different; and a sensor and control device,
wherein the sensor and control device is designed to detect the detection movement or a movement caused by the detection movement, and to control a protective function of the outdoor treatment robot triggered by the detected detection movement or the detected movement, wherein the sensor and control device does not detect or evaluate the avoiding movement or a movement caused by the avoiding movement, wherein the outdoor treatment robot comprises at least one element swing arm, wherein the element swing arm is mounted so as to be movable in rotation about an axis of rotation, wherein the axis of rotation is non-parallel with respect to the direction of travel, wherein the contact element is connected to the element swing arm in such a way that the avoiding movement in the avoiding direction causes an avoiding rotational movement of the element swing arm about the axis of rotation in an avoiding rotational direction, and the detection movement in the detection direction causes a detection rotational movement of the element swing arm about the axis of rotation in a detection rotational direction, wherein the avoiding rotational direction and the detection rotational direction are different, wherein the sensor and control device is designed to detect the detection rotational movement or a movement caused by the detection rotational movement, and to control the protective function triggered by the detected detection rotational movement or the detected movement, and wherein the sensor and control device does not detect or evaluate the avoiding rotational movement or a movement caused by the avoiding rotational movement.

9. The outdoor treatment system according to claim 8, wherein the element swing arm is a pushed element swing arm, and/or wherein the axis of rotation is above the height limit when no contact is being made with an obstacle.

10. An outdoor treatment system, comprising:
an autonomous mobile outdoor treatment robot,
wherein the outdoor treatment robot comprises a chassis and a contact element,
wherein the chassis is designed to execute a travelling movement of the outdoor treatment robot in a direction of travel,
wherein the contact element is designed to execute an avoiding movement in an avoiding direction as a result of the travelling movement in the direction of travel and contact between an obstacle and a lower contact point below a height limit and to execute a detection movement in a detection direction as a result of the travelling movement in the direction of travel and contact between an obstacle and an upper contact point at or above the height limit, the contact element being mounted so as to be movable with respect to the chassis, wherein the avoiding direction and the detection direction are different; and a sensor and control device,
wherein the sensor and control device is designed to detect the detection movement or a movement caused by the detection movement, and to control a protective function of the outdoor treatment robot triggered by the detected detection movement or the detected movement, wherein the sensor and control device does not detect or evaluate the avoiding movement or a movement caused by the avoiding movement, wherein the outdoor treatment robot comprises a cover hood, wherein the cover hood is above the contact element and is mounted so as to be movable with respect to the chassis, wherein the contact element is mounted so as to be movable with respect to the cover hood in such a way that the detection movement causes a hood movement counter to the direction of travel, of the cover hood with respect to the chassis, and the avoiding movement does not, and wherein the sensor and control device is designed to detect the hood movement or a movement caused by the hood movement and to control the protective function triggered by the detected hood movement or the detected movement.

11. The outdoor treatment system according to claim 10, wherein the cover hood is designed to execute the hood movement as a result of the travelling movement in the direction of travel and contact between an obstacle and a hood point.

12. The outdoor treatment system according to claim 10, wherein the contact element is suspended via a spring and/or on the cover hood, and/or wherein the contact element is designed to make contact with a surface to be treated.

13. The outdoor treatment system according to claim 12, wherein the contact element is designed to slide on the surface, and/or wherein the contact element is designed to roll on the surface.

* * * * *